(12) United States Patent
Ben-Yosef et al.

(10) Patent No.: US 7,726,954 B2
(45) Date of Patent: Jun. 1, 2010

(54) DIAPHRAGM PUMP

(75) Inventors: Aryeh Ben-Yosef, Mevasseret Zion (IL); Ephraim Carlebach, Ra'anana (IL)

(73) Assignee: Oridion Medical 1987 Ltd., Jerusalem (IL)

( * ) Notice: Subject to any disclaimer, the term of this patent is extended or adjusted under 35 U.S.C. 154(b) by 840 days.

(21) Appl. No.: 10/566,641

(22) PCT Filed: Jul. 28, 2004

(86) PCT No.: PCT/IL2004/000693

§ 371 (c)(1),
(2), (4) Date: Dec. 4, 2006

(87) PCT Pub. No.: WO2005/010361

PCT Pub. Date: Feb. 3, 2005

(65) Prior Publication Data

US 2007/0081907 A1 Apr. 12, 2007
US 2008/0298987 A9 Dec. 4, 2008

(30) Foreign Application Priority Data

Jul. 29, 2003 (IL) .................................. 157160

(51) Int. Cl.
*F04B 17/00* (2006.01)
*F16D 3/04* (2006.01)

(52) U.S. Cl. ...................... 417/359; 417/413.1; 464/23; 464/105

(58) Field of Classification Search .................. 417/359, 417/413.1; 464/23, 205, 105
See application file for complete search history.

(56) References Cited

U.S. PATENT DOCUMENTS

| | | | |
|---|---|---|---|
| 3,801,232 A | 4/1974 | Kilayko | |
| 5,044,891 A | 9/1991 | Ozawa | |
| 5,074,757 A | 12/1991 | Horn et al. | |
| 5,508,609 A | 4/1996 | Parkinson et al. | |
| 6,227,826 B1 | 5/2001 | Lo et al. | |
| 6,435,844 B1 | 8/2002 | Fukami | |
| 6,561,774 B2 | 5/2003 | Layman | |
| 7,452,193 B1 * | 11/2008 | Wright | 417/429 |

* cited by examiner

*Primary Examiner*—Charles G Freay
(74) *Attorney, Agent, or Firm*—Fennemore Craig, P.C.

(57) ABSTRACT

A diaphragm pump and a method for aligning thereof, the pump including an electric motor, a motor shaft, driven by the electric motor for rotation about an electric motor shaft axis, an eccentric drive, driven by the electric motor, via the motor shaft, to provide reciprocal driving along a pump driving axis, the eccentric drive including an eccentric drive shaft rotating about an eccentric drive shaft axis, the eccentric drive shaft axis being coaxial with the electric motor shaft axis, a non-rigid coupling interconnecting the motor shaft and the eccentric drive shaft and a diaphragm pumping assembly having a fluid inlet and a fluid outlet communicating with a pumping chamber, the pumping chamber having a diaphragm arranged to be reciprocally driven about the pump driving axis.

6 Claims, 5 Drawing Sheets

DIAPHRAGM PUMP

CROSS-REFERENCE TO PRIOR APPLICATION

The above-referenced application is the U.S. National Phase of International Patent Application No. PCT/IL2004/000693, filed Jul. 28, 2004, which claims priority from Israel Patent Application No. 157160, all of which are incorporated by reference herein. The International Application was published Feb. 3, 2005 as WO 2005/010361 A2 under PCT article 21(2).

SUMMARY OF THE INVENTION

The present invention seeks to provide an improved diaphragm pump.

There is thus provided in accordance with a preferred embodiment of the present invention a diaphragm pump including an electric motor, a motor shaft, driven by the electric motor for rotation about an electric motor shaft axis, an eccentric drive, driven by the electric motor, via the motor shaft, to provide reciprocal driving along a pump driving axis, the eccentric drive including an eccentric drive shaft rotating about an eccentric drive shaft axis, the eccentric drive shaft axis being coaxial with the electric motor shaft axis, a non-rigid coupling interconnecting the motor shaft and the eccentric drive shaft, and a diaphragm pumping assembly having a fluid inlet and a fluid outlet communicating with a pumping chamber, the pumping chamber having a diaphragm arranged to be reciprocally driven about the pump driving axis.

In accordance with another preferred embodiment of the present invention the non-rigid coupling includes a slidable coupling. Preferably, the eccentric drive includes first and second bearings located on first and second opposite sides of the eccentric drive shaft. Additionally, at least one of the fluid inlet and the fluid outlet extends in a direction non-perpendicular to the pump driving axis. Alternatively, at least one of the fluid inlet and the fluid outlet extends generally perpendicular to the pump driving axis.

There is also provided in accordance with another preferred embodiment of the present invention a diaphragm pump including a diaphragm pumping assembly having a fluid inlet and a fluid outlet communicating with a pumping chamber, the pumping chamber having a diaphragm arranged to be reciprocally driven along a pump driving axis, wherein at least one of the fluid inlet and the fluid outlet extends generally parallel to the pump driving axis.

Preferably, the diaphragm pump also includes an electric motor providing rotational motion of a motor shaft about an electric motor shaft axis, and an eccentric drive including an eccentric drive shaft which is driven by the electric motor, via the motor shaft, about an eccentric drive shaft axis which is coaxial with the electric motor shaft axis.

There is also provided in accordance with yet another preferred embodiment of the present invention a diaphragm pump including an electric motor, a motor shaft, driven by the electric motor for rotation about an electric motor shaft axis, an eccentric drive, driven by the electric motor, via the motor shaft, to provide reciprocal driving along a pump driving axis, the eccentric drive including an eccentric drive shaft rotating about an eccentric drive shaft axis, the eccentric drive shaft axis being coaxial with the electric motor shaft axis, the eccentric drive including first and second bearings located on first and second opposite sides of the eccentric drive shaft, and a diaphragm pumping assembly having a fluid inlet and a fluid outlet communicating with a pumping chamber, the pumping chamber having a diaphragm arranged to be reciprocally driven about the pump driving axis.

In accordance with another preferred embodiment of the present invention the diaphragm pump also includes a non-rigid coupling interconnecting the motor shaft and the eccentric drive shaft. Preferably, the non-rigid coupling includes a slidable coupling. Additionally, at least one of the fluid inlet and the fluid outlet extends in a direction non-perpendicular to the pump driving axis. Alternatively, at least one of the fluid inlet and the fluid outlet extends generally perpendicular to the pump driving axis.

In accordance with another preferred embodiment of the present invention the diaphragm pump also includes a flange fixed to the electric motor and a housing which houses the non-rigid coupling. Preferably, the flange includes at least one bore and the housing includes at least one socket, the at least one socket having a diameter larger than a diameter of an attachment bolt Additionally, the diaphragm pump also includes a tightness retaining mechanism to secure the attachment bolt in the bore.

There is also provided in accordance with still another preferred embodiment of the present invention a diaphragm pump including an electric motor, a pumping chamber, and a manifold assembly directly mounted onto the pumping chamber and including a manifold assembly inlet and a manifold assembly exhaust communicating with the pumping chamber.

In accordance with another preferred embodiment of the present invention the diaphragm pump also includes a motor shaft, driven by the electric motor for rotation about an electric motor shaft axis, and an eccentric drive including an eccentric drive shaft which is driven by the electric motor, via the motor shaft, about an eccentric drive shaft axis which is coaxial with the electric motor shaft axis. Preferably, the diaphragm pump also includes an absorption cell operative to receive fluid flowing through the manifold assembly inlet. Additionally, the diaphragm pump also includes a detector operative to detect fluid flowing through the manifold assembly inlet.

In accordance with yet another preferred embodiment of the present invention the diaphragm pump also includes a non-rigid coupling interconnecting the motor shaft and the eccentric drive shaft. Preferably, the non-rigid coupling includes a slidable coupling. Additionally, the eccentric drive includes first and second bearings located on first and second opposite sides of the eccentric drive shaft.

There is further provided in accordance with another preferred embodiment of the present invention a method for aligning an eccentric drive shaft axis of an eccentric drive of a diaphragm pump and an electric motor shaft axis of an electric motor of the diaphragm pump including providing a non-rigid coupling, interconnecting an eccentric drive shaft of the eccentric drive and a motor shaft of the electric motor employing the non-rigid coupling, loosely attaching the electric motor to a housing of the eccentric drive, operating the electric motor to coaxially align the eccentric drive shaft and the electric motor shaft, and tightly attaching the electric motor to the housing.

In accordance with another preferred embodiment of the present invention the operating also includes providing an output indication that the electric motor shaft axis and the eccentric drive shaft axis are coaxially aligned. Preferably, the output indication is an output of the diaphragm pump displayed on a monitoring device. Additionally, the operating also includes manually positioning at least one of the electric motor and the housing.

BRIEF DESCRIPTION OF THE DRAWINGS

The present invention will be understood and appreciated more fully from the following detailed description, taken in conjunction with the drawings in which.

DETAILED DESCRIPTION OF A PREFERRED EMBODIMENT

Figure 1:
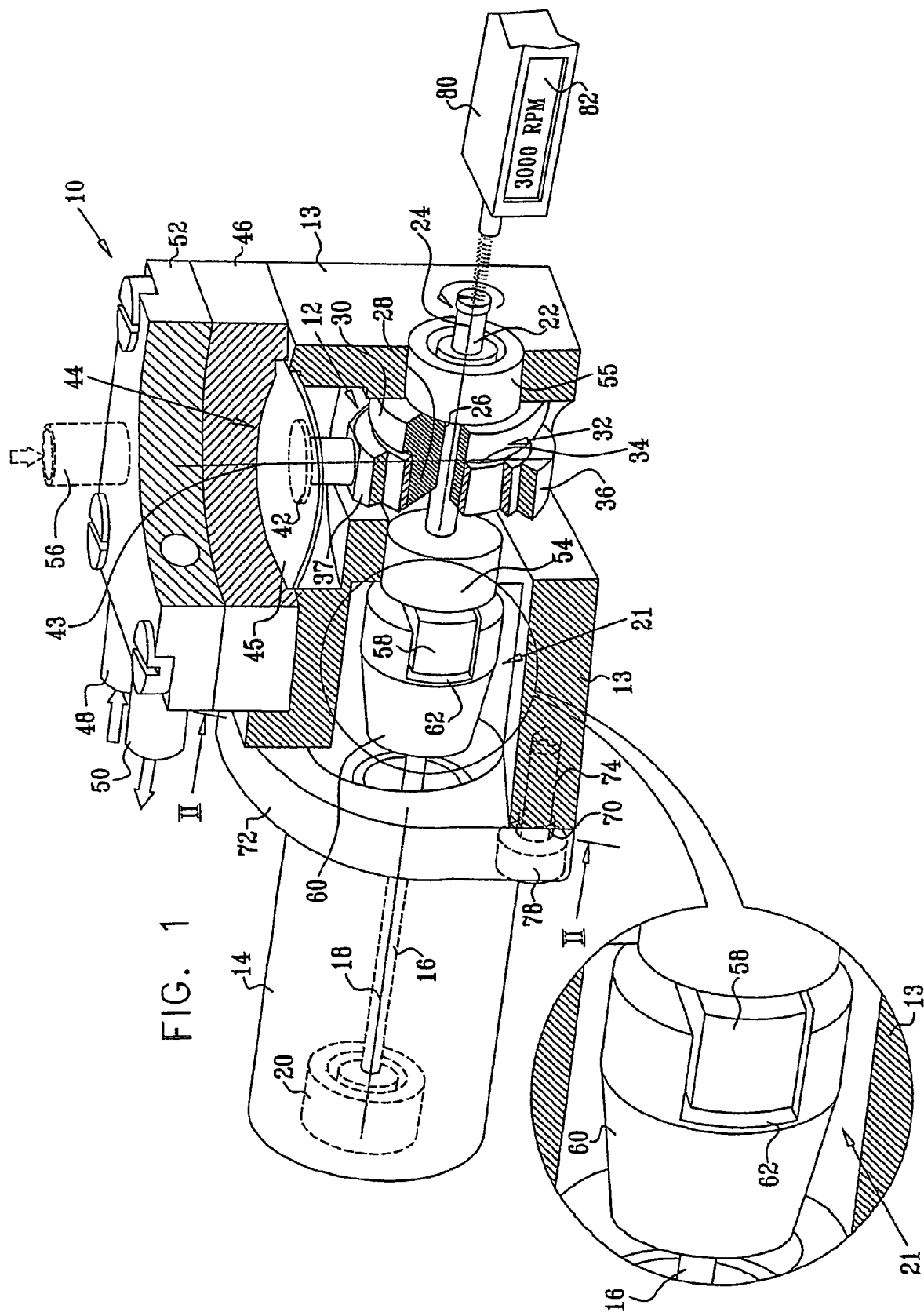
FIG. 1 is a partially pictorial, partially cut-away illustration of a diaphragm pump constructed and operative in accordance with a preferred embodiment of the present invention prior to a preferred operative state.
Figure 2:
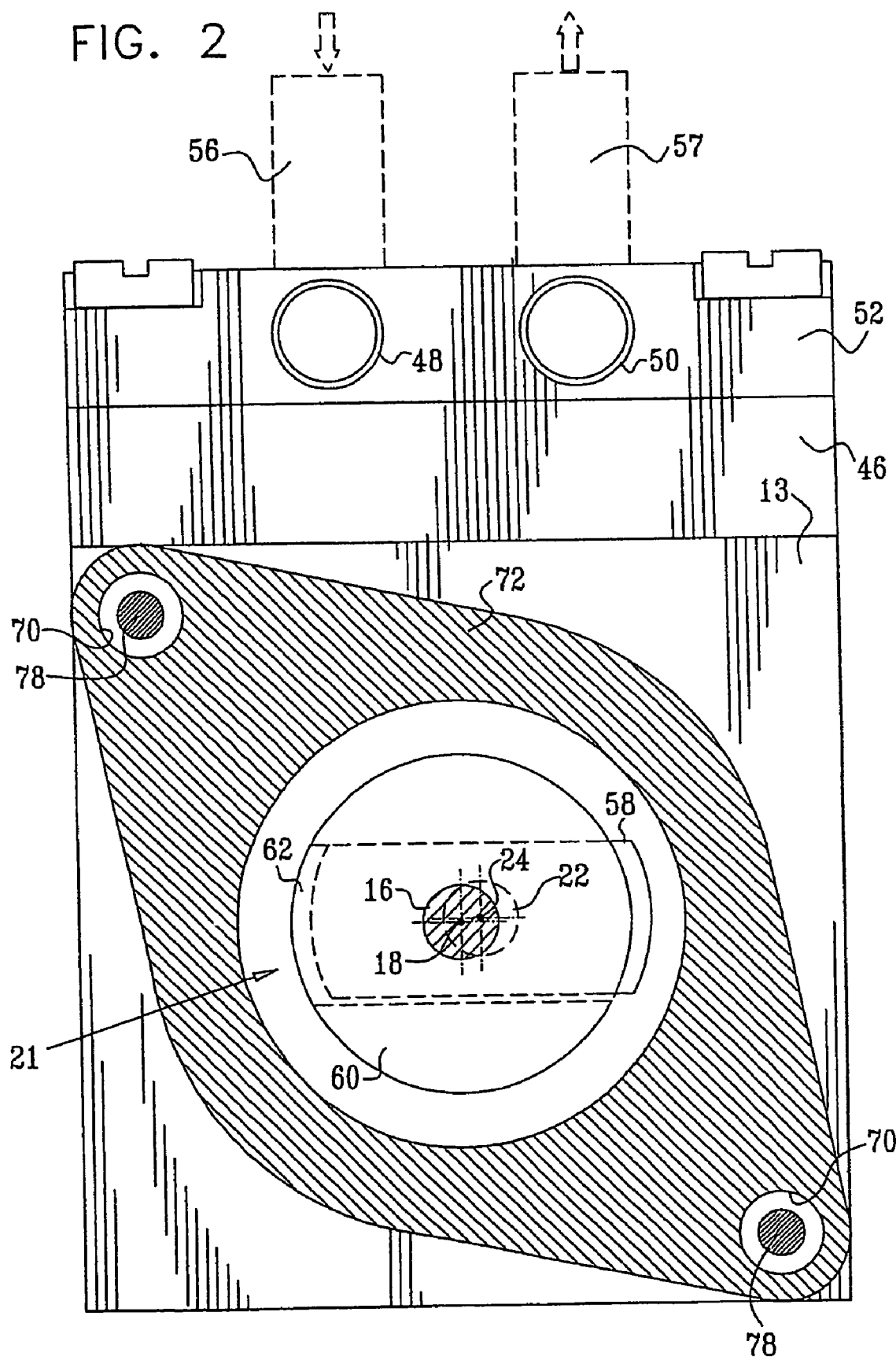
FIG. 2 is a sectional illustration taken along lines II-II in FIG. 1.

Reference is now made to FIGS. 1 and 2, which are a partially pictorial, partially cut-away illustration and a sectional illustration, respectively, of a diaphragm pump constructed and operative in accordance with a preferred embodiment of the present invention prior to a preferred operative state.

As seen in FIG. 1, the diaphragm pump comprises a pumping chamber assembly 10 operated by an eccentric drive assembly 12, which is mounted in a housing 13 and driven by an electric motor 14. An electric motor shaft 16 of electric motor 14 rotates about an electric motor shaft axis 18 and is supported on a first end thereof by an electric motor support bearing 20. Electric motor shaft 16 preferably is coupled at a second end thereof by a non-rigid coupling 21 to an eccentric drive shaft 22. The eccentric drive shaft 22 rotates about an eccentric drive shaft axis 24 of the eccentric drive assembly 12 and extends through a bore 26 formed in a first portion 28 and a second portion 30 of a cam 32. The first portion 28 of the cam 32 typically has a diameter smaller than second portion 30 of cam 32 and is seated within a generally central aperture 34 of an eccentric drive bearing 36. Second portion 30 serves as a counterweight to the eccentric drive bearing 36. The eccentric drive bearing 36 is provided with a housing 37, which has a cam follower 42 mounted thereon.

The eccentric drive bearing 36 and the cam 32 are mounted on eccentric drive shaft 22 such that eccentric drive bearing 36 and cam 32 are non-coaxial with eccentric drive shaft axis 24, so as to move the cam follower 42 in reciprocal motion about a pump driving axis 43. A pumping chamber 44 comprises a diaphragm 45, which diaphragm 45 is seated on the cam follower 42 in a lower portion 46 of the pumping chamber assembly 10. A fluid inlet 48 and fluid outlet 50 extend out of an upper portion 52 of the pumping chamber assembly 10.

It is a particular feature of the present invention that two support bearings 54 and 55 are disposed on first and second opposite sides of the eccentric drive shaft 22, besides the eccentric drive bearing 36 and the electric motor support bearing 20, so as to provide for enhanced support of the load applied by the pumping chamber assembly 10.

In the embodiment of FIG. 1, the fluid inlet 48 and the fluid outlet 50 are shown to extend generally parallel to the electric motor shaft axis 18. Alternatively, a fluid inlet, designated by reference numeral 56 in FIGS. 1-4, and/or a fluid outlet, designated by reference numeral 57 in FIGS. 2 and 4, may be placed on the upper portion 52 of the pumping chamber assembly 10 and extend generally perpendicular to the electric motor shaft axis 18 directly into communication with a non-flexible vessel (not shown).

It is a particular feature of the present invention is that the eccentric drive shaft 22 and the electric motor shaft 16 are connected to each other via non-rigid coupling 21 so as to enable coaxial alignment of the eccentric drive shaft axis 24 with the electric motor shaft axis 18. Eccentric drive shaft 22 is fixed to a first element 58 of the non-rigid coupling 21 and is connected thereby with the electric motor shaft 16, which is fixed to a second element 60 of the non-rigid coupling 21. First element 58 is seated in an aperture 62 formed in second element 60. Aperture 62 is preferably sized so as to allow movement of first element 58 within second element 60 about two perpendicular axes.

FIGS. 1 and 2 show the diaphragm pump during operation prior to coaxial alignment of the eccentric drive shaft axis 24 with the electric motor shaft axis 18 where the eccentric drive shaft axis 24 is horizontally and vertically non-coaxial with the electric motor shaft axis 18. Bores 70 are formed in a flange 72 which is attached to the electric motor 14 and threaded sockets 74 are formed in housing 13. Prior to coaxial alignment of the eccentric drive shaft axis 24 with the electric motor shaft axis 18, threaded attachment bolts 78, with a diameter smaller than the diameter of bores 70, are inserted into bores 70 and threaded into threaded sockets 74, but are not tightened.

A monitoring device, such as a tachometer 80, may be employed to assist in coaxial alignment of the eccentric drive shaft axis 24 with the electric motor shaft axis 18. In FIG. 1 the diaphragm pump is shown to operate in a non-optimal state, as indicated by tachometer 80. An output of a relatively low number of rotations per minute, typically 3000 rpm, is shown on a display screen 82 of the tachometer 80, thereby indicating that the eccentric drive shaft axis 24 is non-coaxial with the electric motor shaft axis 18, as seen in FIG. 2.

Figure 3:
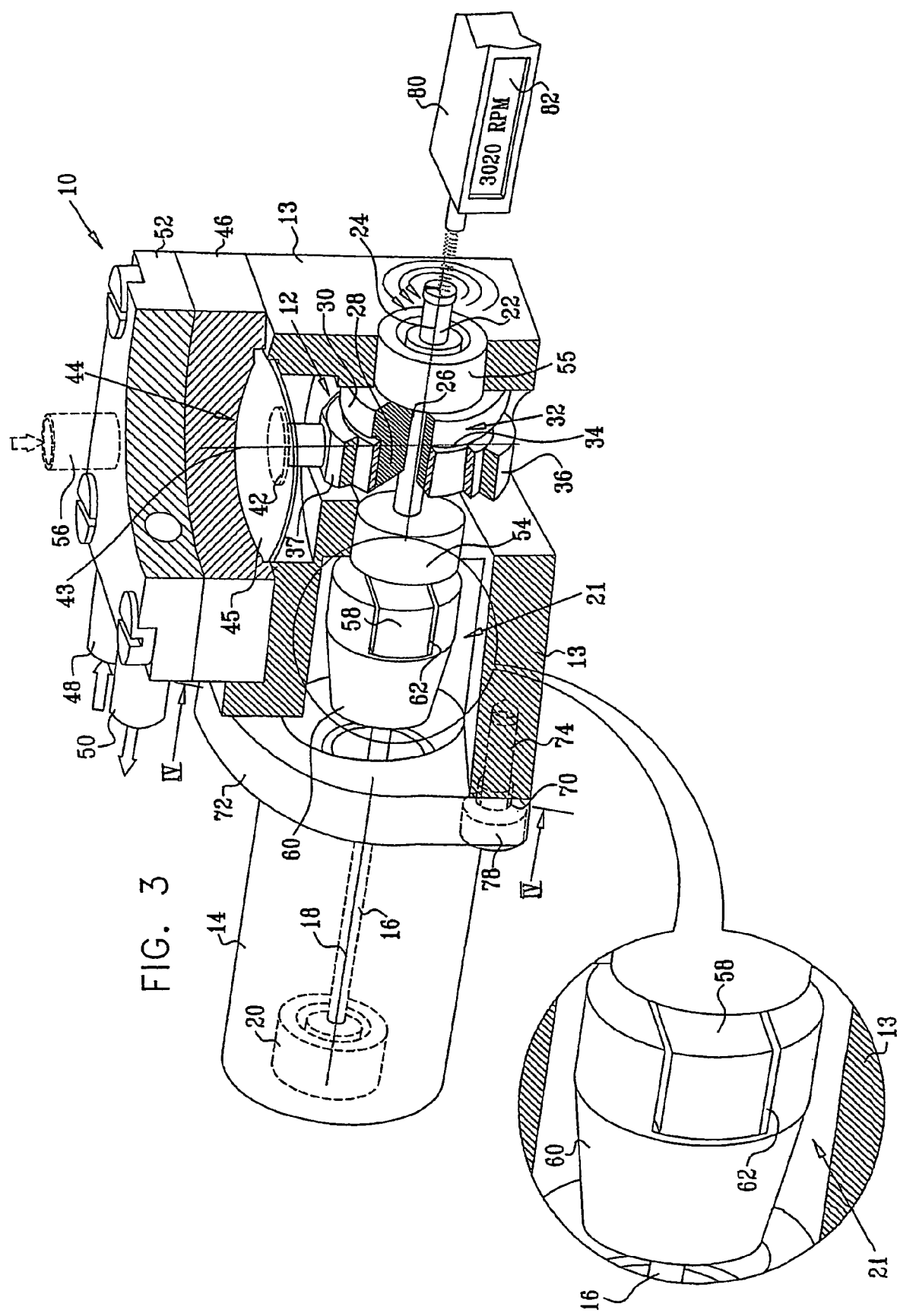
FIG. 3 is a partially pictorial, partially cut-away illustration of a diaphragm pump constructed and operative in accordance with a preferred embodiment of the present invention in a preferred operative state.
Figure 4:
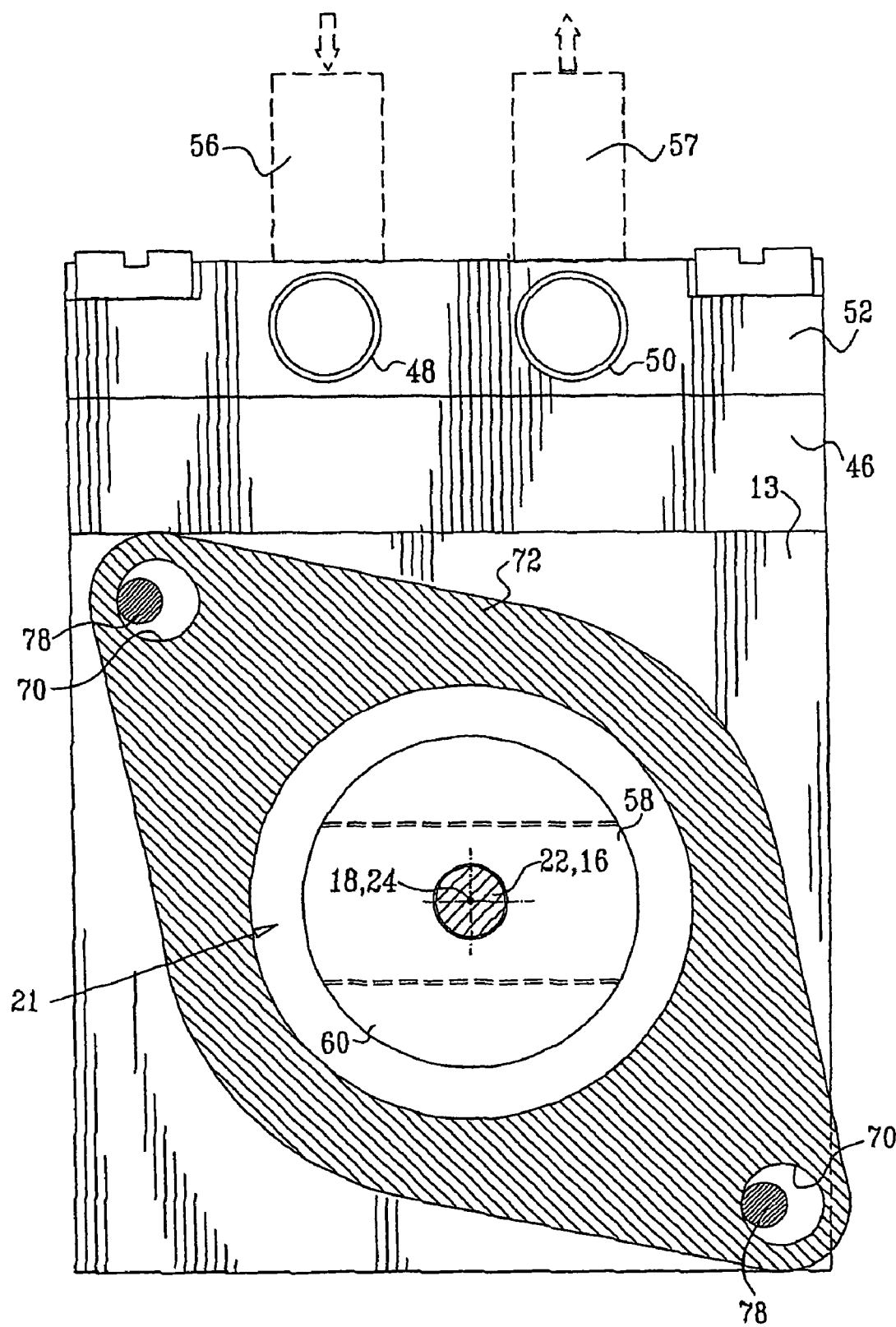
FIG. 4 is a sectional illustration taken along lines IV-IV in FIG. 3.

Reference is now made to FIGS. 3 and 4, which are a partially pictorial, partially cut-away illustration and a sectional illustration, respectively, of a diaphragm pump constructed and operative in accordance with a preferred embodiment of the present invention in a preferred operative state. FIGS. 3 and 4 show an operative state of coaxial alignment of electric motor shaft axis 18 and eccentric drive shaft axis 24 which is attained by operation of the diaphragm pump, including the non-rigid coupling 21 with the electric motor 14 not fully tightened with respect to the eccentric drive assembly housing 13, allowing slight shifting of the relative mounting of the electric motor 14 and the housing 13 to take place, leading to enhanced alignment.

Turning to FIG. 3, it is seen that once an optimal operative state of the diaphragm pump is reached, an output of a relatively higher number of rotations per minute is displayed on the display screen 82 of the tachometer 80, typically 3020 rpm, thereby indicating that the eccentric drive shaft axis 24 is generally coaxial with the electric motor shaft axis 18, as seen in FIG. 4. Thereafter, the attachment bolts 78 are tightened. Preferably, a tightness retaining material, typically an adhesive, such as a LOCTITE® adhesive, commercially available from Henkel Loctite Corp. of 1001 Trout Brook Crossing, Rocky Hill, Conn., U.S.A, is employed so as to prevent undesired movement of attachment bolts 78 within bores 70 during the operation of the diaphragm pump.

Figure 5:
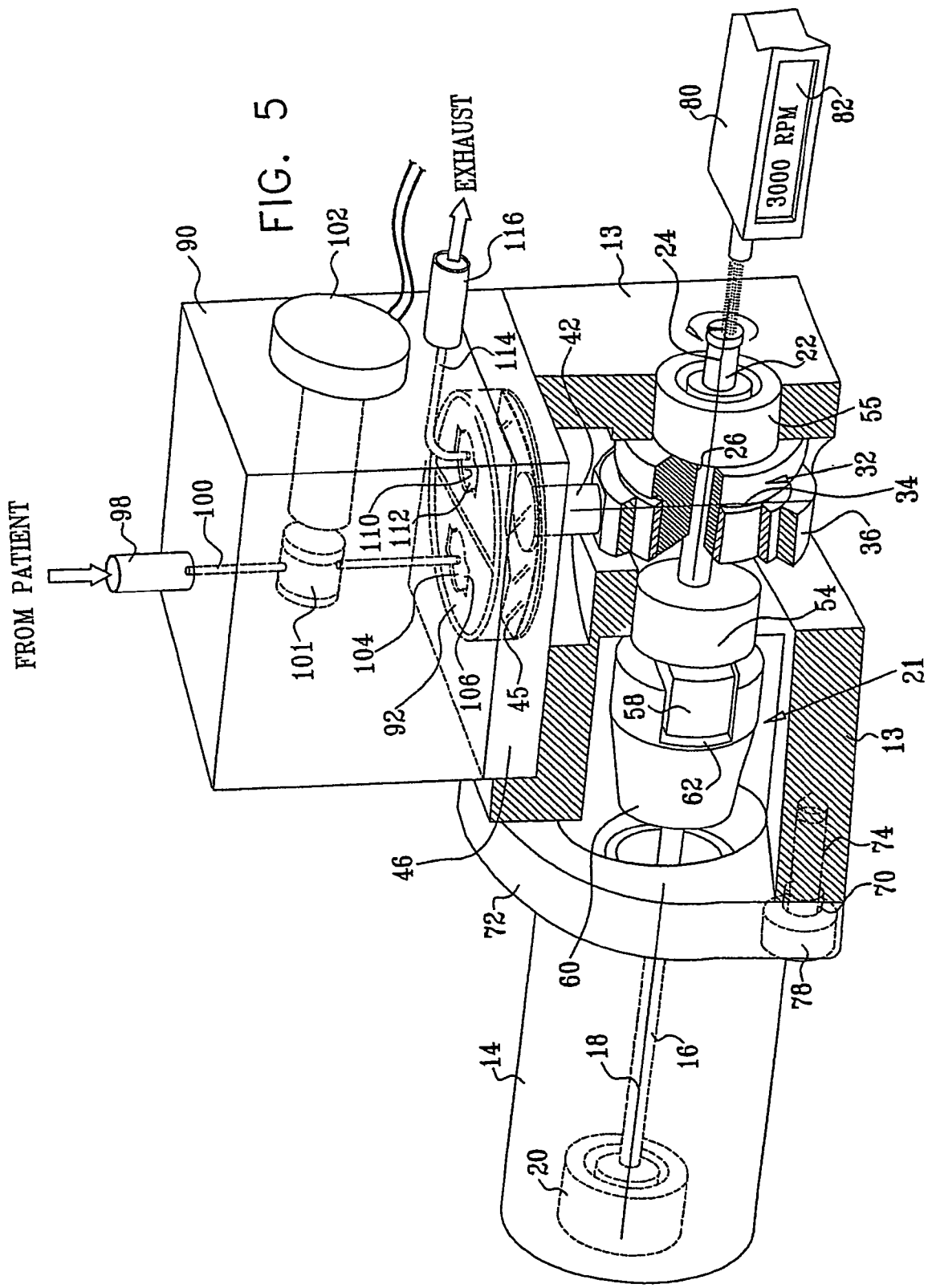
FIG. 5 is a partially pictorial, partially cut-away and partially schematic illustration of a diaphragm pump constructed and operative in accordance with another preferred embodiment of the present invention.

Reference is now made to FIG. 5, which is a partially pictorial, partially sectional and partially schematic illustration of a diaphragm pump and manifold assembly constructed and operative in accordance with another preferred embodiment of the present invention. FIG. 5 shows a manifold assembly 90 directly mounted onto a pumping chamber 92. Pumping chamber 92 may be identical to pumping chamber 44 of pumping chamber assembly 10 shown in FIGS. 1-4. The manifold assembly 90 comprises a manifold assembly inlet 98 which receives a fluid, typically air exhaled by a patient. The fluid flows from the manifold assembly inlet 98 via a first conduit 100, through an absorption cell 101, past a detector 102, such as an optical $CO_2$ detector typically located in front of the absorption cell 101, and flows through a one way valve 104 to a pumping chamber fluid inlet 106 of pumping chamber 92. The fluid flows out of a pumping chamber fluid outlet 110 of the pumping chamber 92 through a one way valve 112, via a second conduit 114 and through a manifold assembly fluid exhaust 116 to the ambient.

It is appreciated by persons skilled in the art that the present invention is not limited by what has been particularly shown and described hereinabove. Rather the scope of the present invention includes both combinations and subcombinations of various features described hereinabove as well as variations and modifications thereto which would occur to a person of skill in the art upon reading the above description and which are not in the prior art.

The invention claimed is:

1. A diaphragm pump comprising:
   an electric motor;
   a motor shaft, driven by said electric motor for rotation about an electric motor shaft axis;
   an eccentric drive, driven by said electric motor, via said motor shaft, to provide reciprocal driving along a pump driving axis, said eccentric drive including an eccentric drive shaft rotating about an eccentric drive shaft axis, said eccentric drive shaft axis being coaxial with said electric motor shaft axis;
   a non-rigid coupling interconnecting said motor shaft and said eccentric drive shaft;
   a diaphragm pumping assembly having a fluid inlet and a fluid outlet communicating with a pumping chamber, said pumping chamber having a diaphragm arranged to be reciprocally driven about said pump driving axis; and
   a flange fixed to said electric motor and a housing which houses said non-rigid coupling,
   wherein said flange comprises at least one bore and said housing comprises at least one socket, said at least one socket having a diameter larger than a diameter of an attachment bolt.

2. A diaphragm pump according to claim 1, further comprising a tightness retaining mechanism to secure said attachment bolt in said bore.

3. A method for aligning an eccentric drive shaft axis of an eccentric drive of a diaphragm pump and an electric motor shaft axis of an electric motor of said diaphragm pump comprising:
   providing a non-rigid coupling;
   interconnecting an eccentric drive shaft of said eccentric drive and a motor shaft of said electric motor employing said non-rigid coupling;
   loosely attaching said electric motor to a housing of said eccentric drive;
   operating said electric motor to coaxially align said eccentric drive shaft and said electric motor shaft; and
   tightly attaching said electric motor to said housing.

4. A method according to claim 3 and wherein said operating also comprises providing an output indication that said electric motor shaft axis and said eccentric drive shaft axis are coaxially aligned.

5. A method according to claim 4 and wherein said output indication is an output of said diaphragm pump displayed on a monitoring device.

6. A method according to claim 3 and wherein said operating also comprises manually positioning at least one of said electric motor and said housing.

* * * * *